US011700300B2

(12) United States Patent
Sah et al.

(10) Patent No.: US 11,700,300 B2
(45) Date of Patent: *Jul. 11, 2023

(54) CLUSTER RESOURCE MANAGEMENT IN DISTRIBUTED COMPUTING SYSTEMS

(71) Applicant: MICROSOFT TECHNOLOGY LICENSING, LLC, Redmond, WA (US)

(72) Inventors: Maneesh Sah, Sammamish, WA (US); Rushi Surla, Kenmore, WA (US); Arild Skjolsvold, Kenmore, WA (US); Xinhua Ji, Redmond, WA (US); Jegan Devaraju, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/703,516

(22) Filed: Mar. 24, 2022

(65) Prior Publication Data

US 2022/0272242 A1 Aug. 25, 2022

Related U.S. Application Data

(63) Continuation of application No. 16/793,651, filed on Feb. 18, 2020, now Pat. No. 11,297,130, which is a
(Continued)

(51) Int. Cl.
*H04L 29/08* (2006.01)
*H04L 67/1008* (2022.01)
(Continued)

(52) U.S. Cl.
CPC .......... *H04L 67/1008* (2013.01); *G06F 9/505* (2013.01); *G06F 9/5061* (2013.01);
(Continued)

(58) Field of Classification Search
CPC ...... G06F 9/505; G06F 9/5083; G06F 9/4856; G06F 9/4401
See application file for complete search history.

(56) References Cited

U.S. PATENT DOCUMENTS

| 6,687,735 B1 * | 2/2004 | Logston | G06F 8/60 |
| | | | 370/486 |
| 6,922,724 B1 * | 7/2005 | Freeman | G06F 9/505 |
| | | | 709/223 |

(Continued)

FOREIGN PATENT DOCUMENTS

| CN | 1614928 A | 5/2005 |
| CN | 103441918 A | 12/2013 |

OTHER PUBLICATIONS

"Summons to attend oral proceedings Issued in European Patent Application No. 18720890.5", dated Feb. 15, 2023, 14 Pages.
(Continued)

*Primary Examiner* — Barbara B Anyan
(74) *Attorney, Agent, or Firm* — Workman Nydegger

(57) ABSTRACT

Techniques are provided for managing resources among clusters of computing devices in a computing system. Resource reassignment message are generated for indicating that servers are reassigned and in response to resource compute loads exceed or fall below certain thresholds. Techniques also include establishing communications with the reassigned servers to assign compute loads without physically relocating the servers from one cluster to another cluster.

20 Claims, 10 Drawing Sheets

Related U.S. Application Data continuation of application No. 15/582,038, filed on Apr. 28, 2017, now Pat. No. 10,609,130.

(51) Int. Cl.

| | |
|---|---|
| *H04L 67/1031* | (2022.01) |
| *H04L 43/16* | (2022.01) |
| *H04L 41/0816* | (2022.01) |
| *H04L 41/0893* | (2022.01) |
| *H04L 47/762* | (2022.01) |
| *G06F 9/50* | (2006.01) |
| *G06T 7/11* | (2017.01) |
| *H04N 13/254* | (2018.01) |
| *H04N 13/271* | (2018.01) |
| *H04N 23/56* | (2023.01) |
| *H04N 23/74* | (2023.01) |
| *G06F 9/48* | (2006.01) |
| *G06F 9/4401* | (2018.01) |

(52) U.S. Cl.
CPC .............. *G06F 9/5083* (2013.01); *G06T 7/11* (2017.01); *H04L 41/0816* (2013.01); *H04L 41/0893* (2013.01); *H04L 43/16* (2013.01); *H04L 47/762* (2013.01); *H04L 67/1031* (2013.01); *H04N 13/254* (2018.05); *H04N 13/271* (2018.05); *H04N 23/56* (2023.01); *H04N 23/74* (2023.01); *G06F 9/4401* (2013.01); *G06F 9/4856* (2013.01); *G06F 2209/505* (2013.01)

(56) References Cited

U.S. PATENT DOCUMENTS

| | | | |
|---|---|---|---|
| 2003/0126202 A1* | 7/2003 | Watt | H04L 67/1008 709/203 |
| 2005/0160133 A1 | 7/2005 | Greenlee et al. | |
| 2008/0172312 A1* | 7/2008 | Synesiou | G06Q 50/06 705/34 |
| 2009/0106571 A1* | 4/2009 | Low | G06F 9/4856 713/310 |
| 2011/0055370 A1* | 3/2011 | Kern | H04L 47/125 709/224 |
| 2011/0191477 A1 | 8/2011 | Zhang | |
| 2015/0341428 A1* | 11/2015 | Chauhan | H04L 63/0209 709/203 |

OTHER PUBLICATIONS

"First Office Action and Search Report Issued in Chinese Patent Application No. 201880026681.5", dated Mar. 17, 2023, 21 Pages.

* cited by examiner

CLUSTER RESOURCE MANAGEMENT IN DISTRIBUTED COMPUTING SYSTEMS

CROSS-REFERENCE TO RELATED APPLICATIONS

This application is a continuation of U.S. patent application Ser. No. 16/793,651 filed on Feb. 18, 2020, entitled "CLUSTER RESOURCE MANAGEMENT IN DISTRIBUTED COMPUTING SYSTEMS," which issued as U.S. Pat. No. 11,297,130 on Apr. 5, 2022, which is a continuation of U.S. patent application Ser. No. 15/582,038 filed on Apr. 28, 2017, entitled "CLUSTER RESOURCE MANAGEMENT IN DISTRIBUTED COMPUTING SYSTEMS," which issued as U.S. Pat. No. 10,609,130 on Mar. 31, 2020, both of which applications are incorporated herein by reference in their entirety.

BACKGROUND OF THE INVENTION

Distributed computing systems typically include multiple routers, switches, bridges, and other network devices that interconnect servers, network storage devices, and other types of nodes via wired or wireless network links. Among other things, the individual nodes can receive and store data from users and can cooperate with one another to facilitate retrieval or modification of the stored user data. Such a data storage technique is commonly referred to as "cloud storage."

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Implementing cloud storage typically involves utilizing a large number of nodes interconnected by a computer network to provide data storage, retrieval, modification, deletion, or other suitable data operations. In order to efficiently manage such large numbers of nodes, subsets of the nodes can be grouped into independently managed computing groups or "clusters." For example, a cloud storage system can be logically and/or physically grouped into multiple clusters individually having a number of front end servers, partition servers, and backend storage servers collectively managed by a cluster controller. The frontend servers can be configured to receive and respond to user requests for reading, writing, erasing, or performing other suitable data operations on certain user data associated with a user account. The partition servers can be configured to determine which backend storage servers contain the requested user data or portions thereof. The backend storage servers can be configured to perform storage, retrieval, maintenance, or other suitable operations on at least a portion of the user data.

The cluster controller can be configured to monitor various data operations of and facilitate functionalities performed by the frontend servers, partition servers, and/or the backend storage servers. For example, the cluster controller can monitor a compute load (e.g., a CPU utilization percentage) on the individual partition servers in a cluster. The cluster controller can also perform load balancing among the multiple partition servers in the cluster by shifting compute load from one partition server to another based on the monitored compute load of the partition servers. In other examples, the cluster controller can monitor a network bandwidth consumption, a received user requests per second, or other suitable operating parameters of the various components in the cluster and reallocating resources accordingly.

The foregoing load balancing technique, however, may be insufficient under certain circumstances to address user demands placed on components in a single cluster. For example, a single cluster can be constrained to contain only a maximum number of servers (e.g., a thousand servers) due to cluster topology or other design limitations. As such, physically adding more servers to the cluster may not be possible or practical to accommodate a large compute load placed on the servers in the cluster. As a result, processing of user requests (e.g., read or write requests) in the cluster can have high latency and long delays, which can negatively impact user experience. One technique in addressing the foregoing drawback is to manually relocate user accounts and associated user data from one cluster to another. Such manual relocation, however, can be labor intensive, inefficient, and prone to errors.

Several embodiments of the disclosed technology can address at least certain aspects of the foregoing difficulty by implementing a cluster resource manager to manage logical resource reallocation among clusters in a distributed computing system. For example, the cluster resource manager can be configured to monitor and logically distribute partition servers or other suitable types of computing, network, or storage resources to clusters in order to accommodate various types of loads experienced by the clusters. In certain embodiments, the cluster resource manager can be one or more standalone servers in the distributed computing system. In other embodiments, the cluster resource manager can be a computing service provided by one or more of the servers in the distributed computing system.

The cluster resource manager can be configured to communicate with the cluster controllers in the distributed computing system to receive status data of network bandwidth, CPU utilization, number of received user requests per second, or other operating parameters of the corresponding clusters. In certain implementations, the cluster resource manager can query the cluster controllers for the status data periodically. In other implementations, the cluster controllers can be configured to report status data to the cluster resource manager on a regular or other suitable basis.

The cluster resource manager can also be configured to determine whether resources are to be shifted from one cluster to another based on the received status data. Such resources can include, for example, frontend servers, partition servers, backend storage servers, or other suitable types of assets in the distributed computing system. In one example, when the cluster resource manager determines that partition servers in a first cluster is operating at an average CPU utilization of more than 90% while other partition servers in a second cluster is operating at 20%, the cluster resource manager can logically shift one or more partition servers from the second cluster to the first cluster to handle a portion of the compute load experienced by the first cluster. In other examples, the cluster resource manager can also logically shift the one or more partition servers based on other suitable thresholds and/or criteria.

To implement the logical resource reallocation, the cluster resource manager can be configured to transmit a resource removal message to the cluster controller of the second cluster. The resource removal message indicates to the cluster controller of the second cluster that an existing partition server in the second cluster is reassigned to the first cluster. In response, the cluster controller of the second cluster can (i) shift any tasks currently performed by the reassigned partition server to one or more other partition servers in the second cluster; (ii) record in a configuration file (e.g., a leaselock file) that the reassigned partition server is no longer logically associated with the second cluster; and (iii) terminate communications between the reassigned partition server and the cluster controller in the second cluster.

The cluster resource manager can also transmit a resource reassignment message to the cluster controller of the first cluster. Transmission of the resource reassignment message can be concurrently, sequentially, interleaved, or in other suitable manners with respect to transmitting the resource removal message to the second cluster. The resource reassignment message can indicate to the cluster controller of the first cluster that the reassigned partition server from the second cluster has been logically reallocated to the first cluster. In response, the cluster controller of the first cluster can (i) establish communication with the reassigned partition server; and (ii) record in a configuration file (e.g., another leaselock file) that the reassigned partition server is a logically a component of the first cluster. The cluster controller at the first cluster can then assign compute load to the reassigned partition server as if the reassigned partition server is physically located in the first cluster. In other examples, the cluster resource manager can also be configured to reassign frontend servers, backend storage servers, and/or other suitable types of resources from one cluster to another.

Several embodiments of the disclosed technology can efficiently address user demands placed on individual clusters in distributed computing systems. By monitoring operating parameters of the clusters, the cluster resource manager can logically shift various types of resources from one cluster to another without having to physically move or add servers in the clusters. As such, delays in processing user requests to read, write, or perform other data operations may be avoided or at least reduced compared to other techniques. As a result, the users may perceive that the amount of resources available at the distributed computing system for processing user requests to be infinite.

DETAILED DESCRIPTION OF THE PREFERRED EMBODIMENTS

Figure 1:
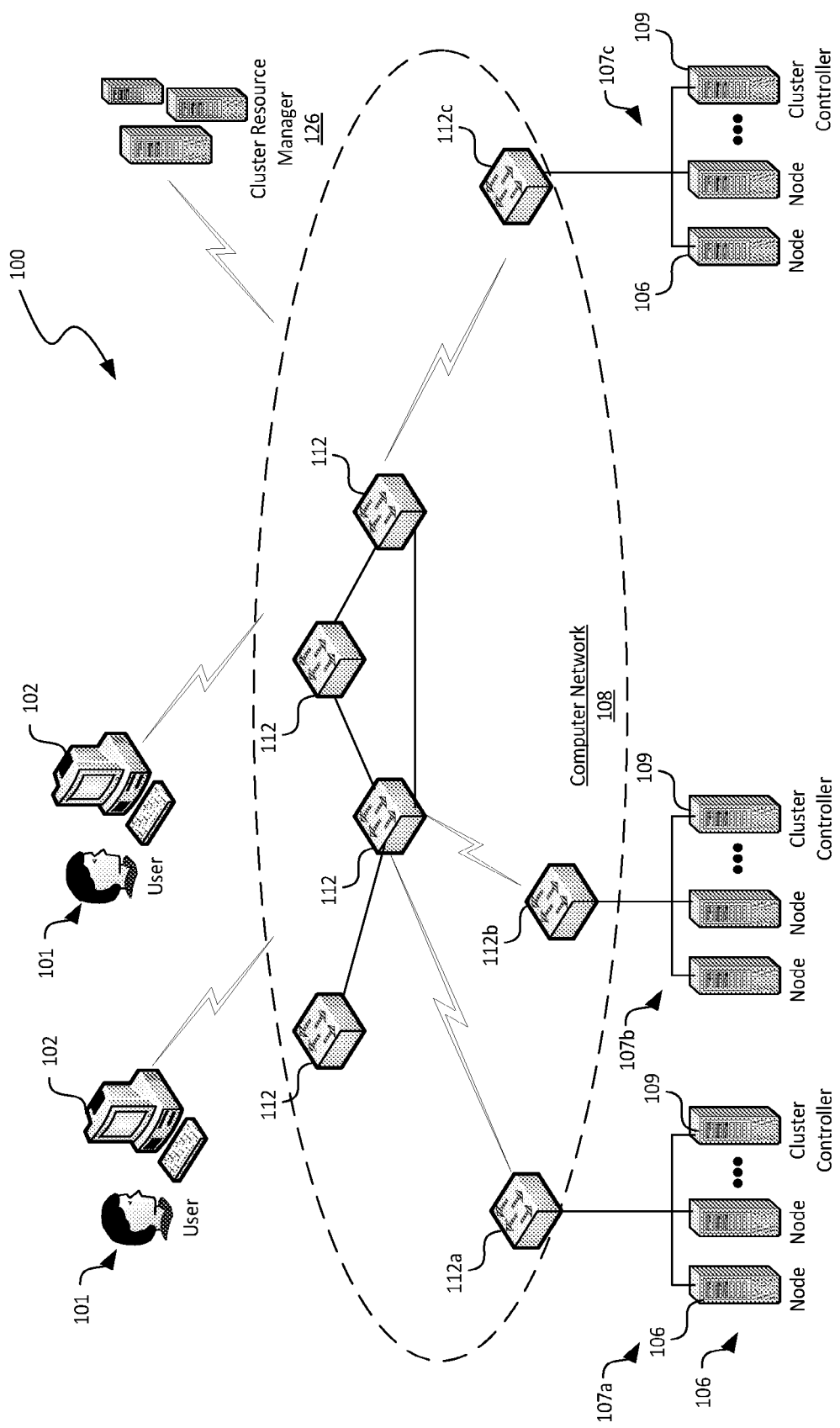
FIG. 1 is a schematic diagram illustrating a distributed computing system implementing cluster resource management in accordance with embodiments of the disclosed technology.

Certain embodiments of systems, devices, components, modules, routines, data structures, and processes for implementing resource reallocation among clusters in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-8.

As used herein, the term a "distributed computing system" generally refers to a computing system having a plurality of network devices that interconnect a plurality of servers or nodes to one another or to external networks (e.g., the Internet) to form an interconnected computer network. The term "network device" generally refers to a physical network device, examples of which include routers, switches, hubs, bridges, load balancers, security gateways, or firewalls. A "node" generally refers to a physical computing device configured to implement, for instance, one or more virtual machines or other suitable virtualized components. For example, a node can include a server having a hypervisor configured to support one or more virtual machines or other suitable types of virtual components for providing various types of cloud computing services.

Further used herein, the term "cloud computing service," "cloud service," or "service" generally refers to one or more computing resources provided over a computer network such as the Internet by a remote computing facility. Example cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Also used herein, a "computing cluster" or "cluster" generally refers to groups, sets, or subsets of nodes in a distributed computing system that are separated managed by one or more corresponding cluster controllers. In one example, a cluster can include a number of frontend servers, partition servers, and backend storage servers (collectively referred to as "servers") operatively coupled to one another by a computer network, as described in more detail below with reference to FIG. 2. The servers can be configured to provide cloud storage services to users. Multiple clusters can be operatively coupled by a computer network in the distributed computing system but separately managed by a corresponding cluster controller. In other examples, a cluster can also include a number of any suitable types of servers, network storage devices, or other components.

In certain implementations, each cluster may be limited to physically accommodate a predefined number of nodes (e.g., servers) due to various design limitations. For instance, a number of servers in a cluster may be limited to a thousand, ten thousand, or other suitable numbers. As such, physically adding more servers to a cluster may not be possible or practical to accommodate a large service demand (e.g., compute load) placed on servers in the cluster. Thus, high latency and long delays in processing of user requests (e.g., read or write requests) in the cluster may result to negatively impact user experience.

Several embodiments of the disclosed technology can address at least certain aspects of the foregoing difficulty by implementing a cluster resource manager to manage resource reallocation among clusters in the distributed computing system without physically moving servers or other components from one cluster to another. The cluster resource manager can be configured to monitor and logically distribute partition servers or other suitable types of computing, network, or storage resources to clusters in order to accommodate various types of loads experienced by the clusters. As such, delays in processing user requests to read, write, or perform other data operations may be avoided or at least reduced compared to other techniques, as described in more detail below with reference to FIGS. 1-8.

FIG. 1 is a schematic diagram illustrating a distributed computing system 100 implementing cluster resource management in accordance with embodiments of the disclosed technology. As shown in FIG. 1, the distributed computing system 100 can include a computer network 108 interconnecting a plurality of nodes 106, a plurality of users 101 via corresponding client devices 102, and a cluster resource manager 126 to one another. Even though particular components of the distributed computing system 100 are shown in FIG. 1, in other embodiments, the distributed computing system 100 can also include network storage devices, maintenance managers, and/or other suitable components (not shown) in addition to or in lieu of the components shown in FIG. 1.

As shown in FIG. 1, the computer network 108 can include multiple network devices 112 that interconnect the multiple nodes 106, the client devices 102, and the cluster resource manager 126. In certain embodiments, the nodes 106 can be organized into racks, action zones, groups, sets, cluster, or other suitable divisions. For example, in the illustrated embodiment, the nodes 106 are grouped into three clusters 107 identified individually as first, second, and third clusters 107a-107c. Each cluster 107 can include multiple nodes 106 managed by a cluster controller 109 configured to monitor various data operations of and facilitate functionalities performed by the corresponding nodes 106 in the clusters 107.

In the illustrated embodiment, each of the clusters 107a-107c is operatively coupled to corresponding network devices 112a-112c, respectively. The network devices 112a-112c are commonly referred to as "top-of-rack" or "TOR" network devices, which are operatively coupled to additional network devices 112 to form the computer network 108 in a hierarchical, flat, mesh, or other suitable types of topology. The computer network 108 can allow communications among the nodes 106, the cluster resource manager 126, and the client devices 102 according to any suitable network protocols. In other embodiments, the multiple node sets 107a-107c can share a single network node 112 or can have other suitable arrangements.

The nodes 106 can individually be configured to provide computing, storage, and/or other suitable cloud computing services to the individual users 101. For example, as described in more detail below with reference to FIG. 2, the nodes 106 in each cluster 107 can be configured as front end servers, partition servers, and backend storage servers 106a-106c (shown in FIG. 2) to provide cloud storage services to the users 101. The users 101 can then utilize the provided cloud storage services to store, retrieve, manage, or perform other suitable data operations on user data.

The client devices 102 can each include a computing device that facilitates corresponding users 101 to access cloud services provided by the nodes 106 via the computer network 108. For example, in the illustrated embodiment, the client devices 102 individually include a desktop computer. In other embodiments, the client devices 102 can also include laptop computers, tablet computers, smartphones, or other suitable computing devices. Even though two users 101 are shown in FIG. 1 for illustration purposes, in other embodiments, the distributed computing system 100 can facilitate any suitable number of users 101 to access suitable types of cloud computing services provided by the nodes 106.

In accordance with several embodiments of the disclosed technology, the cluster resource manager 126 can be configured to monitor and logically distribute resources such as nodes 106 from one cluster to another in order to accommodate various types of loads experienced by the individual clusters 107. In certain embodiments, the cluster resource manager 126 can include a standalone server, desktop computer, laptop computer, or other suitable types of computing device operatively coupled to the computer network 108. In other embodiments, the cluster resource manager 126 can include one of the nodes 106 in one of the clusters 107. In further embodiments, the cluster resource manager 126 can be implemented as one or more computing services executing on and provided by, for example, one or more of the nodes 106 or another server (not shown). Example components and operations of the cluster resource manager 126 are described in more detail below with reference to FIGS. 3A-3D.

Figure 2:
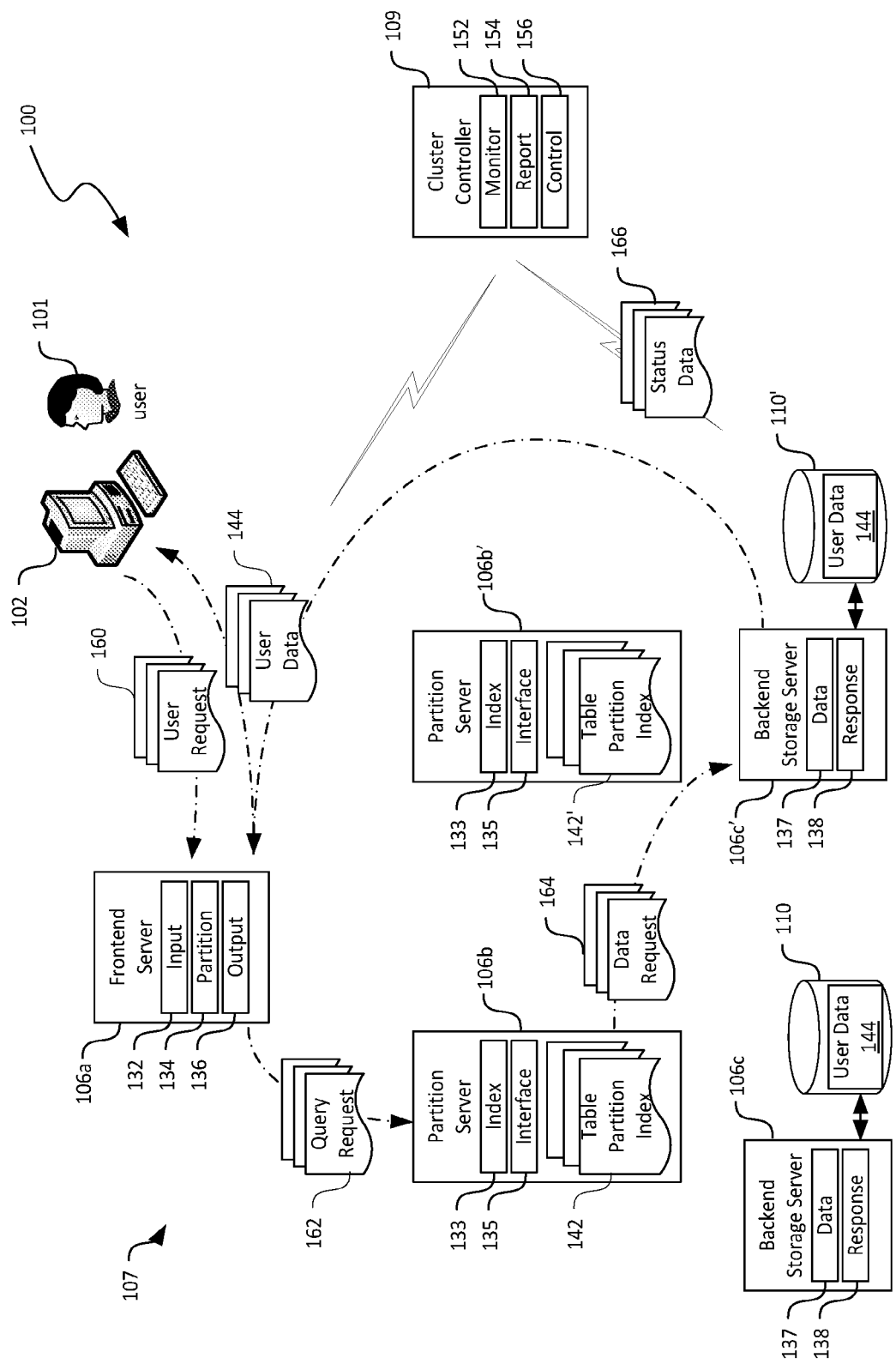
FIG. 2 is a schematic diagram illustrating certain hardware/software components of a cluster in the distributed computing system of FIG. 1 in accordance with embodiments of the disclosed technology.

FIG. 2 is a schematic diagram certain hardware/software components of a cluster 107 in the distributed computing system 100 of FIG. 1 in accordance with embodiments of the disclosed technology. In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may also include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component, and a third component. The foregoing components can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a tablet computer, a network server, a laptop computer, a smartphone, and/or other suitable computing devices.

Equally, components may include hardware circuitry. In certain examples, hardware may be considered fossilized software, and software may be considered liquefied hardware. As just one example, software instructions in a component may be burned to a Programmable Logic Array circuit, or may be designed as a hardware component with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media. As used herein, the term "computer readable storage media" excludes propagated signals.

As shown in FIG. 2, the cluster 107 can include one or more frontend server 106a, partition servers 106b, and backend storage servers 106c (collectively referred to as "servers") operatively coupled by the computer network 108 in FIG. 1. In the illustrated embodiment, one frontend server 106a, two partition servers 106b, and two backend storage servers 106c are shown for illustration purposes. In other embodiments, the cluster 107 can include any suitable number of different types of servers provided that a predefined number of servers is not exceeded.

The individual servers can each be a computing device having a processor, a memory, and an input/output component (not shown) operatively coupled to one another. The processor can include a microprocessor, a field-programmable gate array, and/or other suitable logic devices. The memory can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor (e.g., instructions for performing the methods discussed below with reference to FIGS. 5A-7). The input/output component can include a display, a touch screen, a keyboard, a mouse, a printer, and/or other suitable types of input/output devices configured to accept input from and provide output to an operator and/or an automated software controller (not shown). An example computing architecture suitable for the frontend server 106a, the partition servers 106b, and the backend servers 106c is described in more detail below with reference to FIG. 8.

The servers can individually contain instructions in the memory executable by the processors, to cause the servers to provide modules that can facilitate providing cloud storage services to the users 101. For example, as shown in FIG. 2, the frontend server 106a can include an input module 132, a partition module 134, and an output module 136 operatively coupled to one another. The input module 132 can be configured to received user request 160 from the user 101 via the client device 102. The user request 160 can include a request to store, retrieve, erase, or perform other suitable data operations on user data 144. In response to the received user request 160, the partition module 134 can be configured to determine which partition server 106b contains a table partition index 142 associated with a user account of the user 101. For example, as shown in FIG. 2, the first partition server 106b was determined to contain the table partition index 142 for the user 101. The output module 136 can then forward a query request 162 to the partition server 106b based on the received user request 160.

The partition server 106b can include an index module 133, an interface module 135, and a table partition index 142. In the cluster 107, locations at which user data 144 is stored can be tracked using an index table having rows and columns. However, the index table can be quite large due to a large number of user accounts. As such, the index table can be partitioned into multiple table partition indices 142, for example, to contain a subset of the rows and columns of the index table. The multiple table partition indices 142 can then be individually stored and managed by a corresponding partition server 106a. For example, as shown in FIG. 2, the first partition server 106b can contain a first table partition index 142 while the second partition server 106b' can contain a second table partition index 142' that is different than the first table partition index 142. In other examples, the index table can be partitioned into three, four, or any suitable numbers.

In certain embodiments, the table partition index 142 can include a portion or subset of the index table containing locations at which the requested user data 144 is stored. In the example shown in FIG. 2, the first table partition index 142 can include a row containing a user account identifier corresponding to the user 101 and a location (e.g., the second backend storage server 106c') at which the requested user data 144 is stored. Thus, the index module 133 can be configured to scan the first table partition index 142 to determine that the requested user data 144 is stored at the second backend storage server 106c'. Based on the determination, the interface module 135 can be configured to generate and transmit a data request 164 to the second backend storage server 106c' based on the query request 162.

The second backend storage server 106c' can include a data module 137 and a response module 138 operatively coupled to a storage 110'. The data module 137 can be configured to facilitate storage, retrieval, management, or other data operation on the user data 144. For example, the data module 137 can be configured to retrieve requested user data 144 from a corresponding storage 110'. The response module 138 can then be configured to generate a response, for example, containing the requested user data 144 and provide the user data 144 to the frontend server 106a. In the illustrated embodiment, the frontend server 106a can then provide the requested user data 144 to the client device 102. In other embodiments, the backend storage server 106c' can also provide the requested user data 144 directly to the client device 102 or via other suitable network channels.

As shown in FIG. 2, the cluster 107 can include a cluster controller 109 configured to monitor various data operations of and facilitate functionalities performed by the servers in the cluster 107. The cluster controller 109 can include a monitor module 152, a report module 154, and a control module 156 operatively coupled to one another. The monitor module 152 can be configured to monitor one or more operating parameters of the servers in the cluster 107. For example, the monitor module 152 can periodically poll or receive status data 166 from the servers. The status data 166 can include data representing one or more of a compute load (e.g., a CPU utilization percentage), a network bandwidth consumed, a number of user requests 160 received per second, or other suitable parameters related to operations of the servers in the cluster 107. The report module 154 can be configured to transmit the collected status data 166 representing the operating parameters to the cluster resource manager 126 (FIG. 3A) periodically, upon request, or in other suitable manners.

The control module 156 can be configured to perform load balancing among the servers in the cluster 107. For example, the control module 156 can be configured to shift compute load from the first partition server 106b to the second partition server 106b' based on CPU utilization percentages of the partition servers 106b such that the compute load on both partition servers 106b can be generally equal. The control module 156 can also be configured to facilitate reassignment of one or more of the servers from the cluster 107 to other cluster 107 without physically moving the one or more reassigned servers, as described in more detail with reference to FIGS. 3A-3D.

FIGS. 3A-3D are block diagrams illustrating components of the cluster resource manager 126 and first and second clusters 107a and 107b during stages of resource reallocation in accordance with embodiments of the disclosed technology. Even though only two clusters 107 are shown in FIGS. 3A-3D for illustration purposes, in other embodiments, similar operations may be performed with three, four, or any suitable number of clusters 107.

Figure 3A:
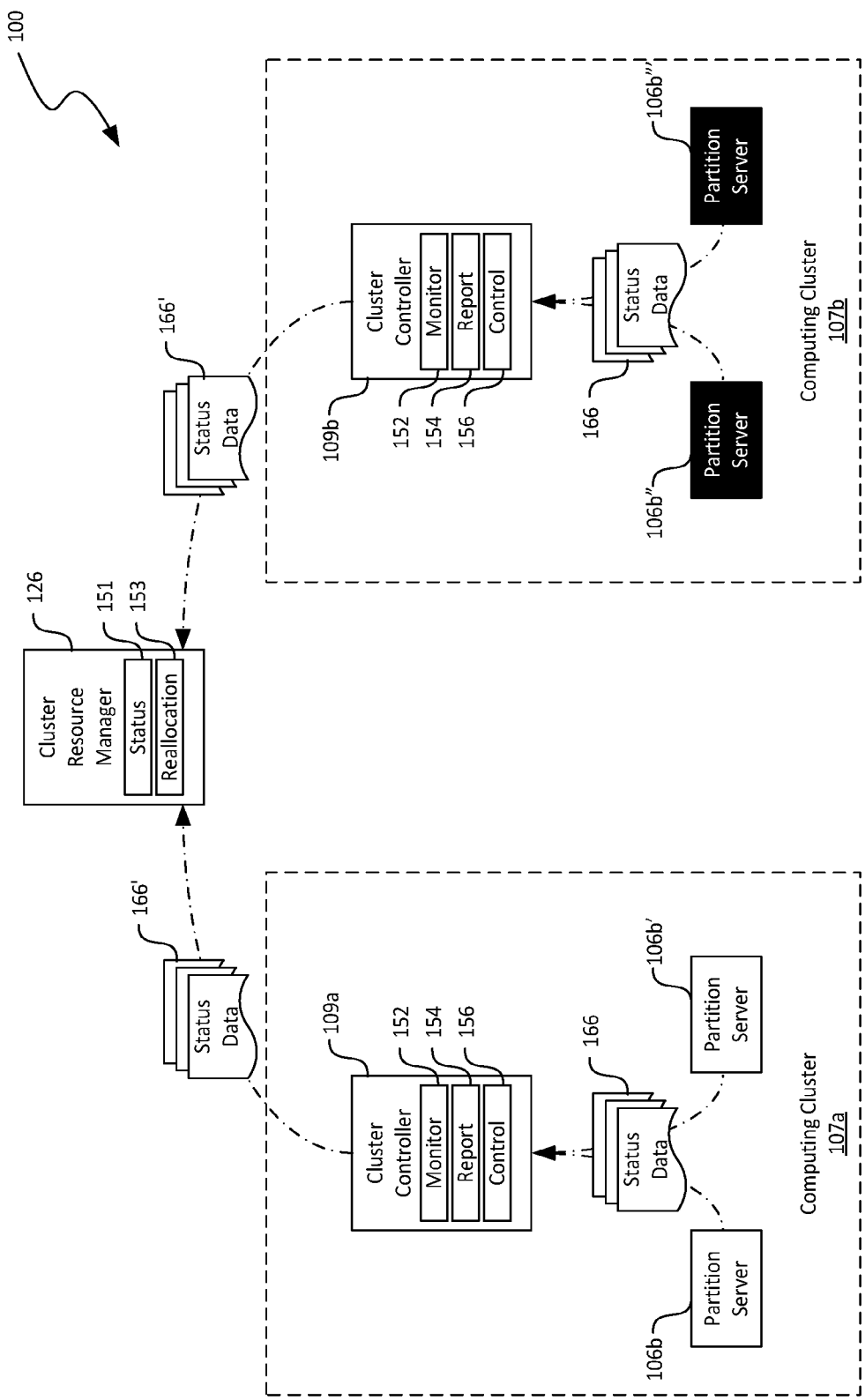
FIGS. 3A-3D are block diagrams illustrating certain components of a cluster resource manager and first and second clusters in the distributed computing system during certain stages of resource reallocation between the first and second clusters in accordance with embodiments of the disclosed technology.

As shown in FIG. 3A, the first and second clusters 107a and 107b can each include a first cluster controller 109a and a second cluster controller 109b, respectively. The first and second cluster controllers 109a and 109b can individually include a monitor module 152 configured to monitor one or more operating parameters of servers, as described above with reference to FIG. 2. In FIGS. 3A-3D, only two partition servers 106b in each cluster 107 are shown with different background colors for illustration purposes. The first and second cluster controllers 109a and 109b can also individually include a report module 154 configured to compile, sort, filter, or perform other suitable processing on the collected one or more operating parameters into a set of status data 166' and provide the status data 166' to the cluster resource manager 126.

As shown in FIG. 3A, the cluster resource manager 126 can include a status module 151 and a reallocation module 153 operatively coupled to one another. The status module 151 can be configured to receive the status data 166' from the first and second clusters 107a and 107b and provide the received status data 166' to the reallocation module 153 for further processing. In certain embodiments, the status module 151 can also be configured to store the received status data 166' in, for example, a network storage (not shown).

The reallocation module 153 can be configured to determine whether resources (e.g., partition servers 106b) can be reassigned from one cluster 107 to another based on the received status data 166'. For example, in one embodiment, the reallocation module 153 can compare an average compute load of the partition servers 106b of each cluster 107a and 107b to a first threshold. When the average compute load of the second cluster 107b exceeds the first threshold, the reallocation module 153 can be configured to determine whether the compute load of the first cluster 107a is below a second threshold. When the compute load of the first cluster 107a is below the second threshold, the reallocation module 153 can then determine that one of the partition server 106b of the first cluster 107a can be logically reassigned to the second cluster 107b.

Figure 3B:
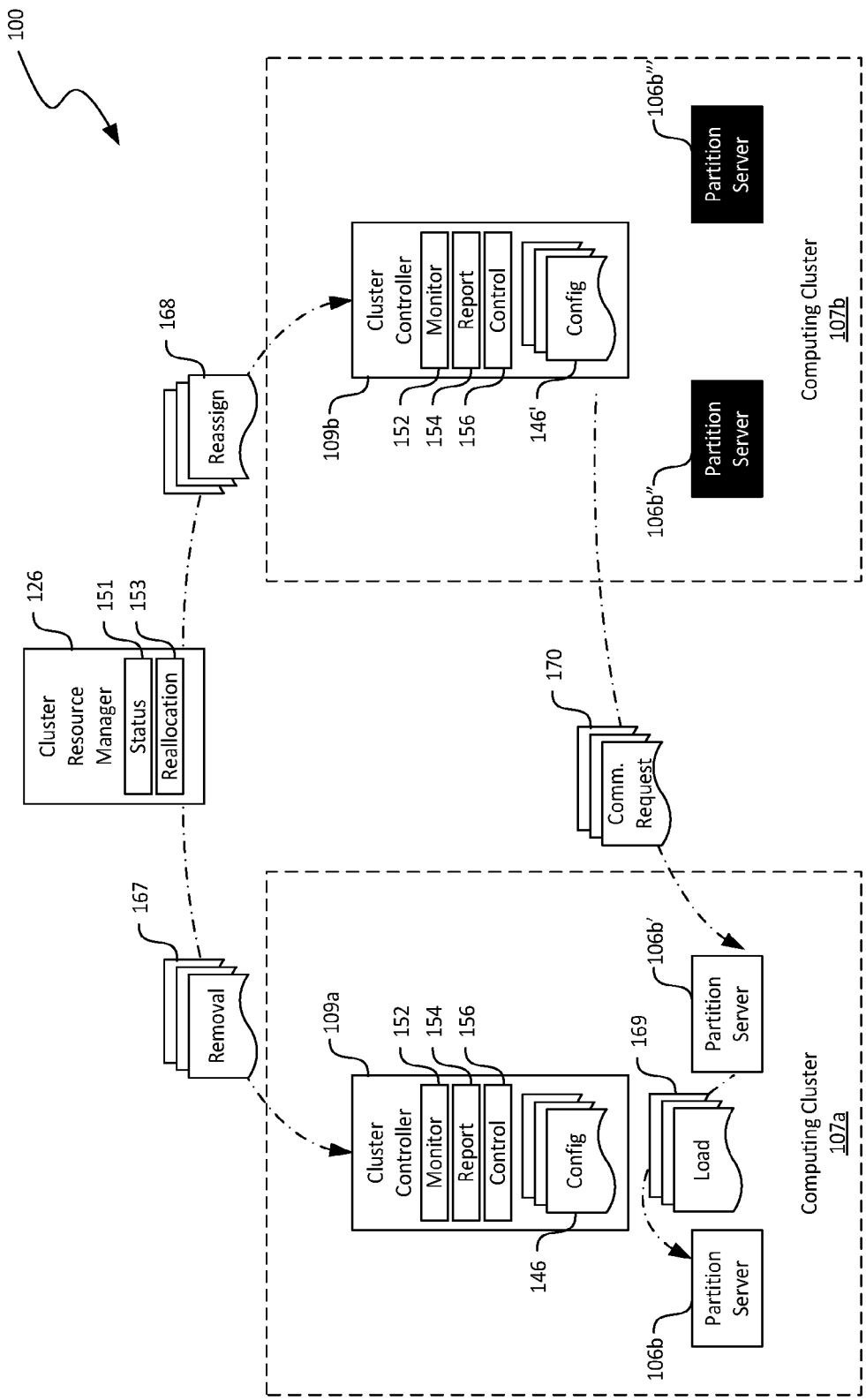

As shown in FIG. 3B, based on the foregoing determination, the reallocation module 153 can generate and transmit, via the computer network 108 of FIG. 1, a resource removal message 167 to the first cluster controller 109a. The resource removal message 167 can indicate to the first cluster controller 109a that the second partition server 106b' has been reassigned to the second cluster 107b. In response, the control module 156 of the first cluster controller 109a can be configured to determine whether the second partition server 106b' is currently processing compute load for the first cluster 107a.

If the second partition server 106b' is currently processing compute load for the first cluster 107a, the control module 156 can be configured to instruct the second partition server 106b' to migrate the load 169 to the first partition server 106b. If the second partition server 106b' is not currently processing compute load for the first cluster 107a or the load 169 has been migrated, the first cluster controller 109a can terminate communications with the second partition server 106b' and thus allowing the second cluster controller 109b to establish communications with the second partition server 106b' by, for example, transmitting a communication request 170.

The control module 153 can also be configured to generate or update a configuration file 146 to record that the second partition server 106b' has been reassigned to the second cluster 107b. During reboot of the first cluster controller 109a or re-initialization of the first cluster 107a, the first cluster controller 109a can ignore the second partition server 106b' based on the recorded reassignment in the configuration file 146.

Figure 3C:
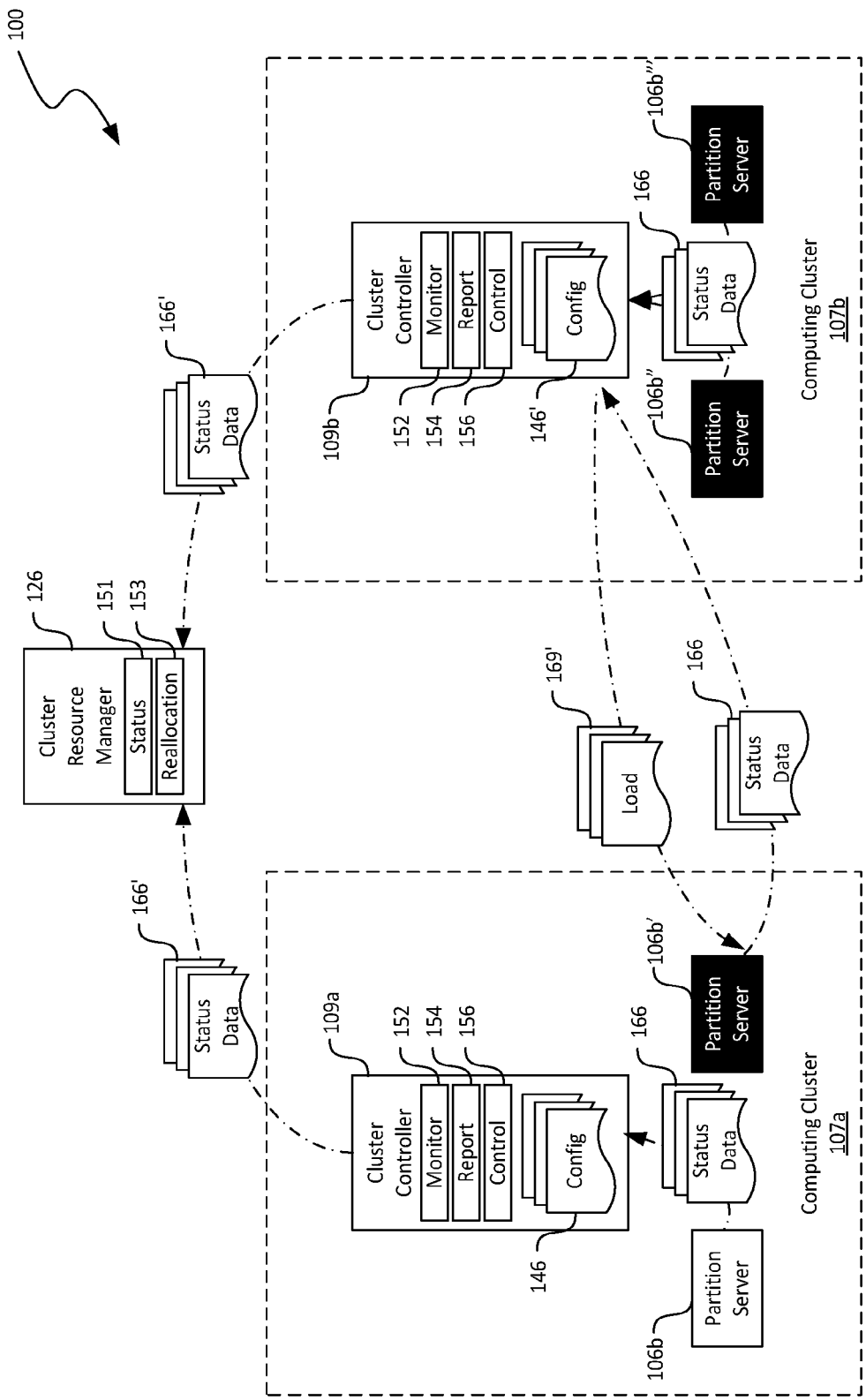

As shown in FIG. 3B, the reallocation module 153 can also be configured to transmit a resource reassignment message 168 to the second cluster controller 109b concurrently, sequentially, or in other suitable temporal orders with respect to transmitting the resource removal message 167 to the first cluster controller 109a. Upon receiving the resource reassignment message 168, the control module 156 in the second cluster controller 109b can be configured to generate or update another configuration file 146' to record that the second partition server 106b' from the first cluster 107a has been assigned to the second cluster 107b. The control module 156 can also be configured to establish communications with the second partition server 106b' by transmitting, for example, the communication request 170. Upon establishing communications with the second partition server 106b', the second cluster controller 109b can store a table partition index 142 (FIG. 2) in the second partition server 106b' and assign compute load 169' to the second partition server 106b' to facilitate access to the stored table partition index 142, as shown in FIG. 3C. Also shown in FIG. 3C, the monitor module 152 of the second cluster controller 109b can also monitor one or more operating parameters of the second partition server 106b' by collecting status data 166 periodically or on other suitable basis.

As discussed above with reference to FIGS. 3A-3D, the second partition server 106b' from the first cluster 107a is logically reallocated or reassigned to the second cluster 107b without physically moving the second partition server 106b'. As such, several embodiments of the disclosed technology can efficiently address user demands placed on individual clusters 107 in the distributed computing system 100. By monitoring operating parameters of the clusters 107, the cluster resource manager 126 can logically shift various types of resources from one cluster to another without having to physically move or add servers in the clusters 107. As such, delays in processing user requests 160 to read, write, or perform other data operations may be avoided or at least reduced compared to other techniques. As a result, the users 101 may perceive that the amount of resources available at the distributed computing system for processing user requests to be infinite.

Figure 3D:
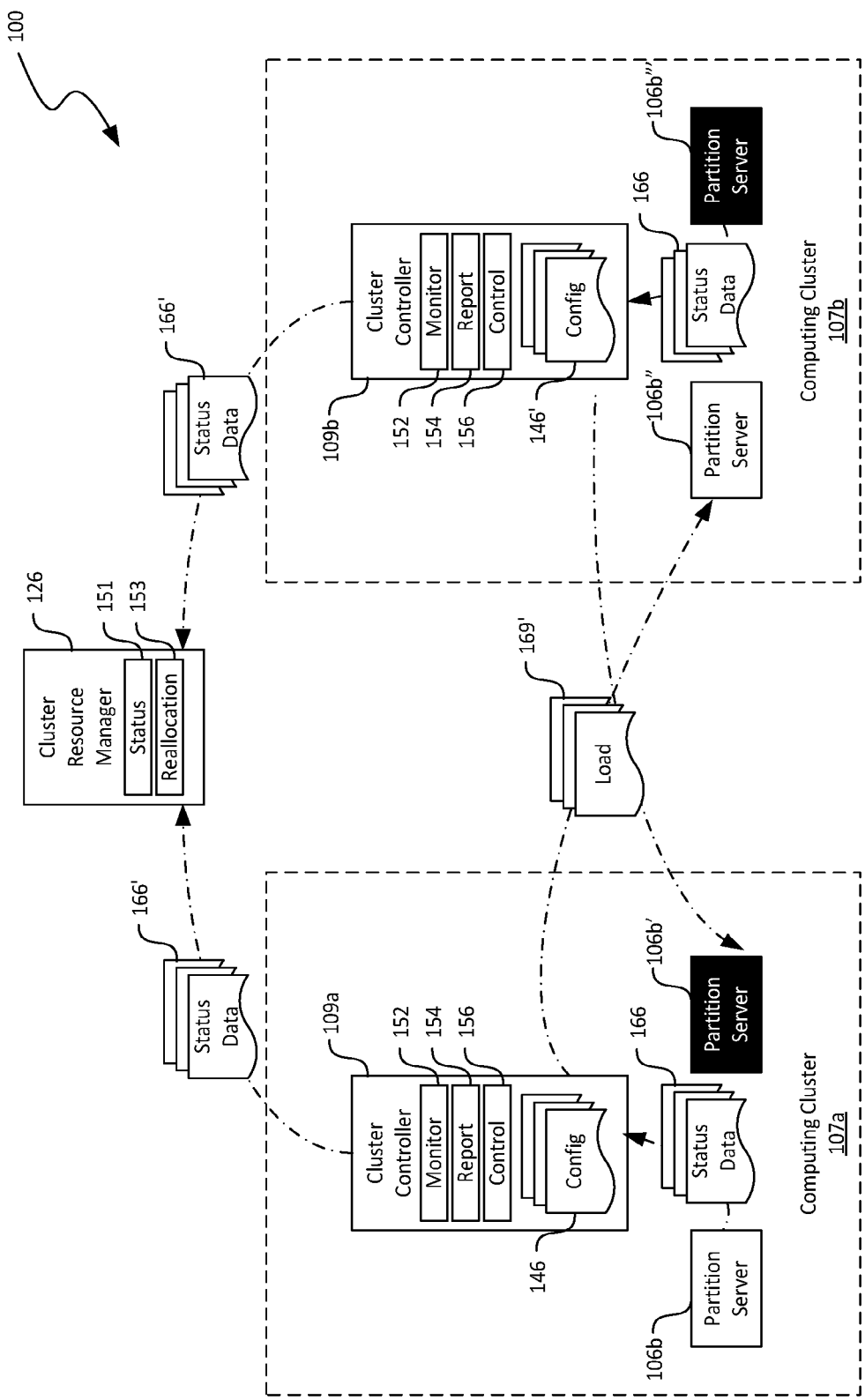

Even though the partition servers 106b are used as example resources to be logically reallocated in FIGS. 3A-3D, similar techniques can also be applied to reallocate or reassign frontend servers 106a, backend storage servers 106c, or other suitable resources among the clusters 107. Also, the cluster resource manager 126 can continually monitor operating parameters from all of the clusters 107 and adjust resource allocation accordingly. For example, if the reallocation module 153 of the cluster resource manager 126 determines that the first cluster 107a is now operating with a compute load exceeding the threshold, the reallocation module 153 can be configured to reassign the second partition server 106b' back to the first cluster 107a, as shown in FIG. 3A, or reassign one of the other partition servers 106b" and 106b''' to the first cluster 107a from the second cluster 107b, as shown in FIG. 3D.

Figure 4A:
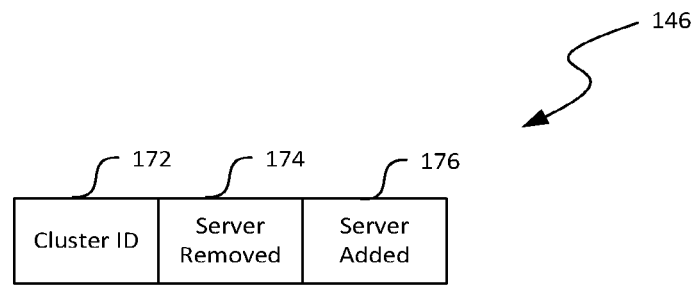
FIGS. 4A and 4B are block diagrams illustrating example data schema suitable for a configuration file and status data in FIGS. 3A-3D, respectively, in accordance with embodiments of the disclosed technology.
Figure 4B:
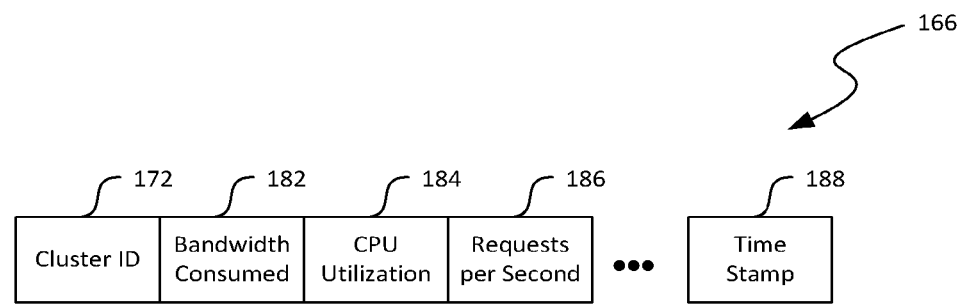

FIGS. 4A and 4B are block diagrams illustrating example data schema suitable for a configuration file and status data in FIGS. 3A-3D, respectively, in accordance with embodiments of the disclosed technology. As shown in FIG. 4A, the example schema for the configuration file 146 can include a cluster ID filed 172, a server removed field 174, and a server added field 176. The cluster ID filed 172 can be configured to store an identification (e.g., a numerical value) of a cluster 107 (FIG. 1). The server removed field 174 can be configured to store an identification (e.g., an IP address, a MAC address, a serial number, etc.) of one of more servers removed from management by the cluster 107. The server added field 176 can be configured to store an identification (e.g., an IP address, a MAC address, a serial number, etc.) of one of more servers added logically to the cluster 107.

As shown in FIG. 4B, the example data schema for the status data 166 can include a cluster ID field 172, a bandwidth consumed field 182, a CPU utilization field 184, a requests per second field 186, and a time stamp filed 188. The bandwidth consumed field 182 can be configured to store a value representing an instantaneous, average, or other suitable types of network bandwidth consumed by a cluster 107. The CPU utilization field 184 can be configured to store a value representing an instantaneous, average, or other suitable types of CPU utilization values of servers in the cluster 107. The requests per second field 186 can be configured to store an instantaneous, average, or other suitable types of a number of user requests 160 received per second. The time stamp field 188 can be configured to store a time stamp value (e.g., date/time) at which the status data 166 is generated or transmitted.

FIGS. 5A-7 are flowcharts illustrating aspects of processes of resource reallocation from one cluster to another in a distributed computing system 100 in accordance with embodiments of the disclosed technology. Even though the processes are described in connection with the distributed computing system 100 of FIG. 1, in other embodiments, the processes can also be implemented in computing systems with different and/or additional components.

Figure 5A:
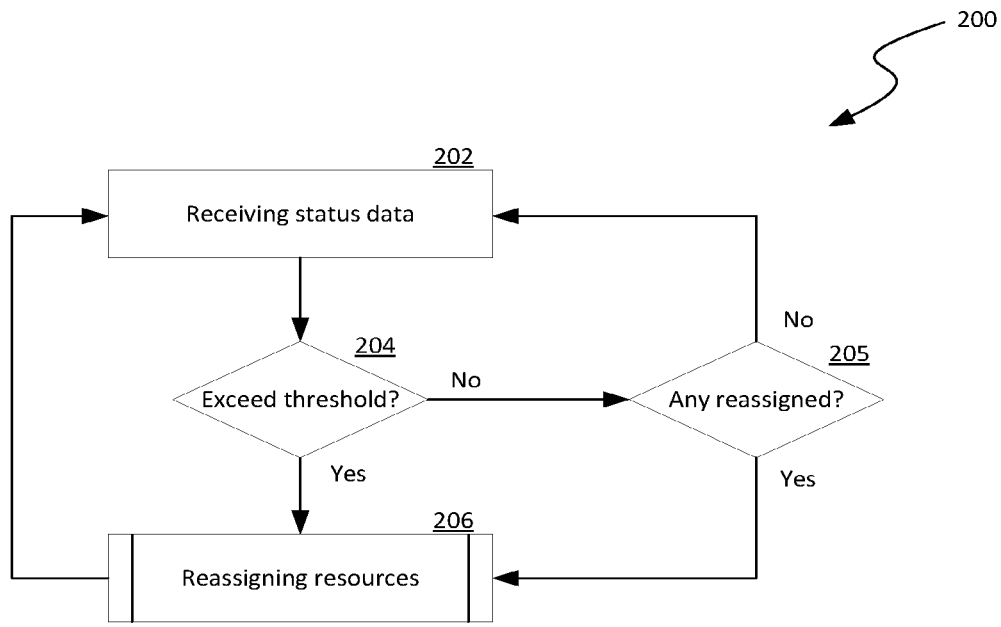
FIGS. 5A-7 are flowcharts illustrating aspects of processes of resource reallocation from one cluster to another in a distributed computing system in accordance with embodiments of the disclosed technology.

As shown in FIG. 5A, the process 200 can include receiving status data at stage 202. As described above with reference to FIG. 4B, the status data can include various field configured to contain one or more operating parameters related to components (e.g., servers) in a cluster 107 (FIG. 1). The process 200 can then include a decision stage 204 to determine whether one or more operating parameter (e.g., a CPU utilization) of a cluster 107 exceeds a threshold. In response to determining that the one or more operating parameter exceeds the threshold, the process 200 can include reassigning resources from another cluster to the cluster at stage 206. Example operations of reassigning resources are described in more detail below with reference to FIG. 5B.

In response to determining that the one or more operating parameter does not exceed the threshold, in certain embodiments, the process 200 can include another decision stage 205 to determine whether the cluster 107 includes any resources reassigned from one or more other clusters 107. In response to determining that the cluster 107 includes resources (e.g., servers) reassigned from one or more other clusters 107, the process 200 can include returning the reassigned resources from one or more other clusters 107 back to the one or more other clusters 107. In other embodiments, the operation at stage 205 can be omitted.

Figure 5B:
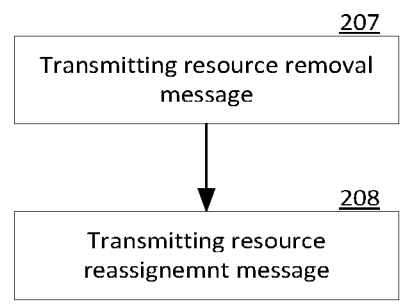

As shown in FIG. 5B, operations of reassigning resources can include transmitting a resource removal message to one cluster 107 at stage 207 and transmitting a resource reassignment message to another cluster 107 at stage 208. Even though the operations at stages 207 and 208 are shown as sequential in FIG. 5B, in other embodiments, the operations at stages 207 and 208 can be performed concurrently, in an interleaved manner, or in other suitable manners.

Figure 6:
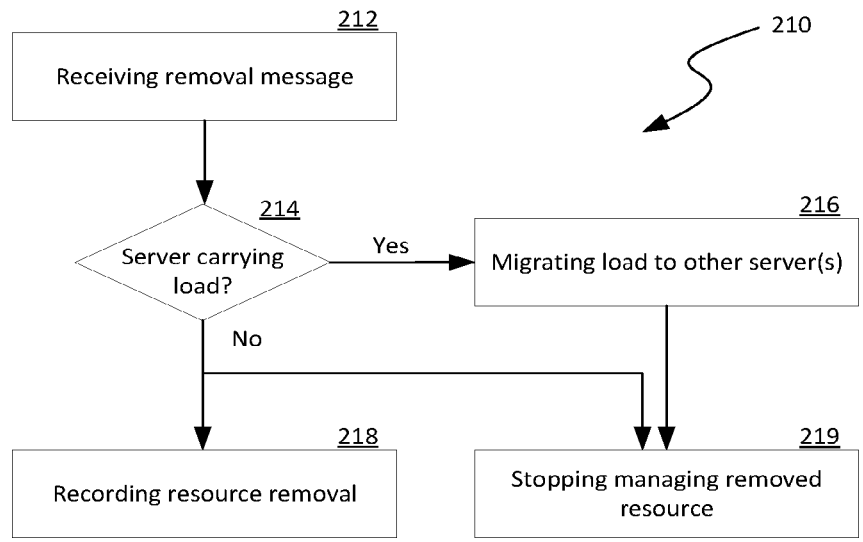

As shown in FIG. 6, a process 210 can include receiving a resource removal message at a cluster 107 (FIG. 1) to logically remove a server from the cluster 107 at stage 212. The process 210 can then include a decision stage 214 to determine whether the server is currently carrying load for the cluster 107. In response to determining that the server is currently carrying load for the cluster 107, the process 210 can include migrating the load from the server to one or more other servers in the cluster 107 and subsequently stopping managing the removed server at stage 219. In response to determining that the server is not currently carrying load for the cluster 107, the process 210 proceeds to stopping managing the removed server at stage 219 and recording, for example, in the configuration file 146 (FIGS. 3A-3D), that the server has been reassigned from the cluster 107 to another cluster.

Figure 7:
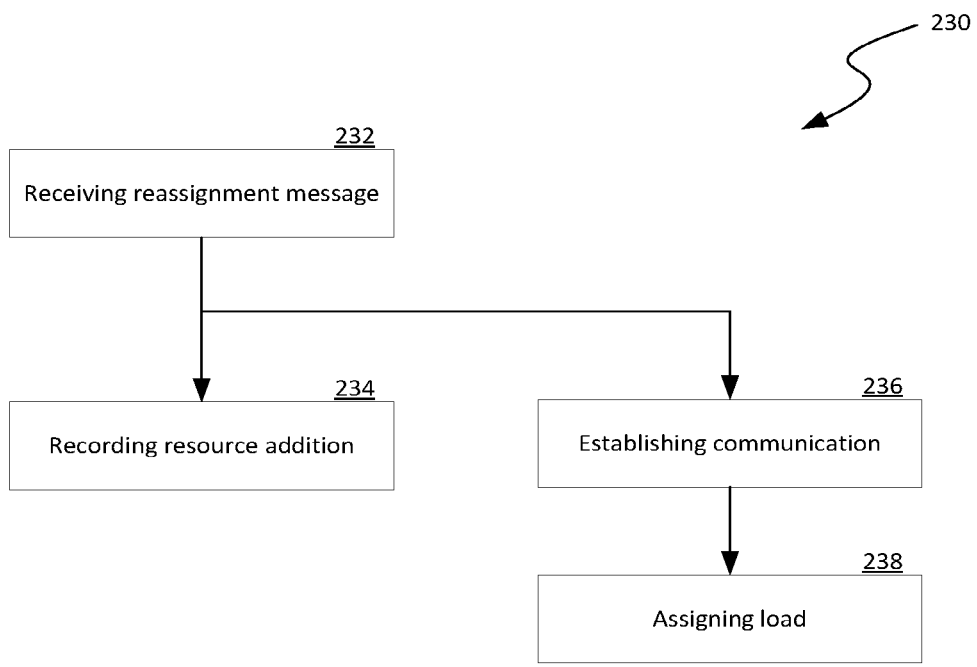

As shown in FIG. 7, the process 230 can include receiving a resource reassignment message at stage 232. The resource reassignment message can indicate that one or more servers from another cluster has been reassigned to the current cluster. The process 230 can then include recording that the one or more servers from another cluster has been reassigned to the current cluster at stage 234 and establishing communications with the one or more reassigned servers at stage 236. Subsequently, the process 230 can include assigning a load to the one or more reassigned servers once communications with the one or more servers is established.

Figure 8:
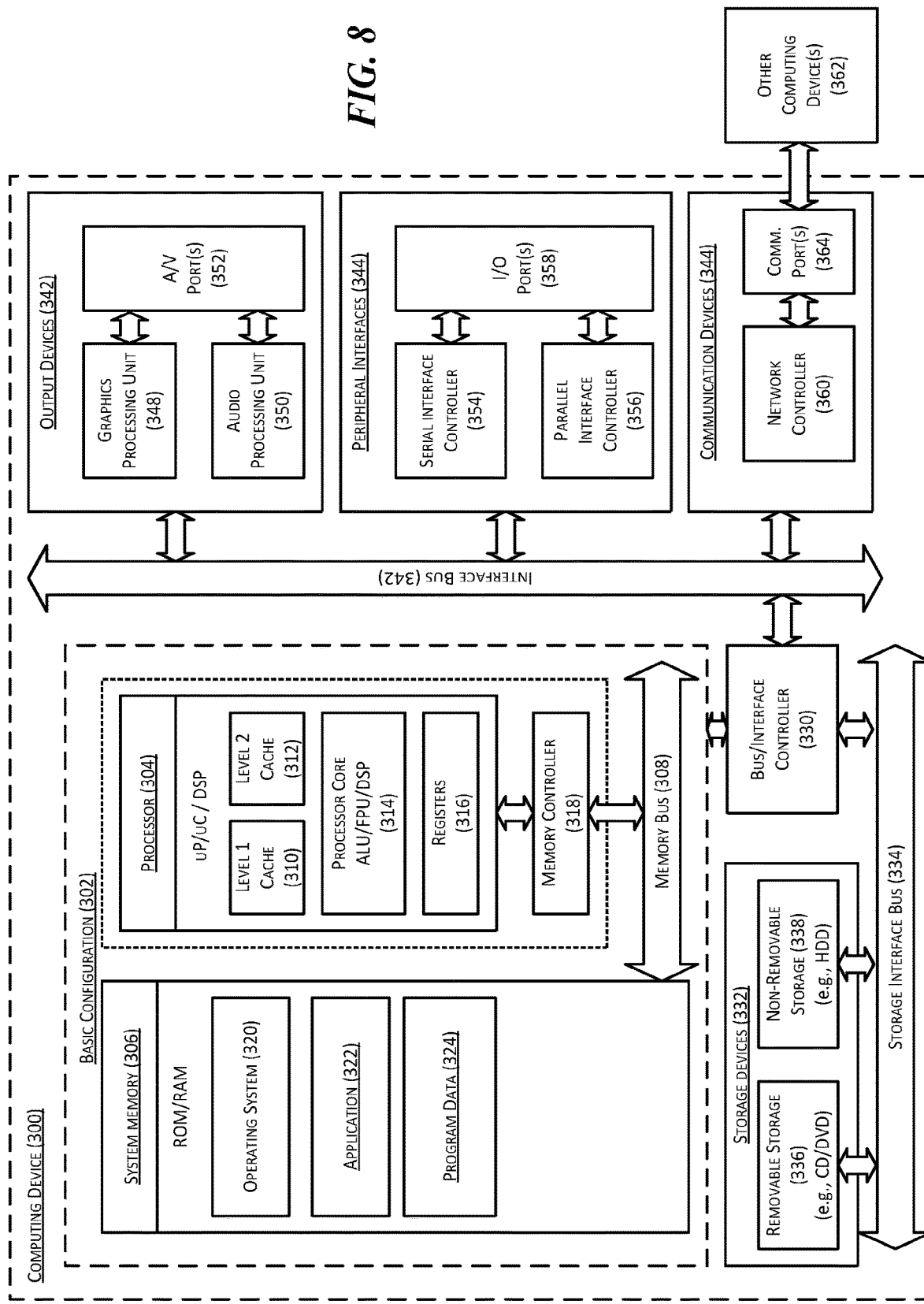
FIG. 8 is a computing device suitable for certain components of the distributed computing system in FIG. 1.

FIG. 8 is a computing device 300 suitable for certain components of the distributed computing system 100 in FIG. 1. For example, the computing device 300 can be suitable for the nodes 106, the client devices 102, or the cluster resource manger 126 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

What is claimed is:

1. A method implemented by a cluster resource manager of managing resources among clusters in a distributed computing system, the clusters including first and second clusters individually containing multiple servers interconnected to one another by a computer network and managed by a first cluster controller and a second cluster controller, respectively, the method comprising:
    the cluster resource manager receiving, via the computer network, status data from the first cluster controller of the first cluster, the status data representing a compute load experienced by the first cluster; and
    generating and sending a resource removal message to the first cluster controller when the compute load of the first cluster in the status data is below a threshold, the resource removal message indicating that a server from the first cluster is reassigned to the second cluster, the resource removal message instructing the first cluster controller to create or update a configuration file indicating that the server is reassigned from the first cluster, and thereby causing the first cluster controller to subsequently ignore the reassigned server.

2. The method of claim 1 wherein generating and sending the resource removal message the first cluster controller occurs in response to a determination being made that (i) the compute load of the first cluster in the status data is below a threshold; and (ii) a compute load of the second cluster is above another threshold.

3. The method of claim 1, further comprising:
    receiving, via the computer network, additional status data from the first cluster controller of the first cluster, the additional status data representing another compute load experienced by the first cluster; and
    generating and transmitting, to the first cluster controller, a resource assignment message in response to determining the another compute load in the transmitted additional status data is still below the threshold, the resource assignment message indicating that another server from the first cluster is assigned to the second cluster.

4. The method of claim 1, further comprising:
    receiving, via the computer network, additional status data from the first cluster controller of the first cluster, the additional status data representing another compute load experienced by the first cluster; and
    generating and transmitting to the first cluster controller, a resource assignment message when the another compute load of the first cluster in the transmitted additional status data is above another threshold, the resource assignment message indicating that the server from the second cluster is reassigned back to the first cluster.

5. The method of claim 1, further comprising transmitting, to the first cluster controller, a resource assignment message when a compute load of the second cluster would not exceed a threshold when the server previously assigned from the first cluster is reassigned from the second cluster back to the first cluster, the resource assignment message indicating that the server from the second cluster is reassigned to the first cluster.

6. The method of claim 1 wherein the server reassigned from the first cluster to the second cluster frontend server configured to receive and respond to user requests for reading, writing, erasing, or performing other suitable data operations on user data associated with a user account.

7. The method of claim 1 wherein the server reassigned from the first cluster to the second cluster is a partition server configured to determine a location in which the requested user data or portions thereof is stored.

8. The method of claim 1 wherein the server reassigned from the first cluster to the second cluster is a backend storage server configured to perform storage, retrieval, or maintenance on at least a portion of the user data.

9. The method of claim 1, further comprising generating and transmitting, to the first cluster controller, another resource removal message, the another resource removal message indicating that another server from the first cluster is assigned to a third cluster, the another resource removal message instructing the first cluster controller to create or update the configuration file indicating that the another server is reassigned from the third cluster, thereby causing the first cluster controller to ignore the reassigned another server during a reboot of the first cluster controller or a re-initialization of the first cluster.

10. A cluster resource manager computing device in a cluster of a distributed computing system having multiple clusters individually containing multiple servers interconnected by a computer network, the computing device comprising:
 a processor; and
 a memory containing instructions executable by the processor to cause the processor to:
 receive, via the computer network, status data from a first cluster controller of the first cluster, the status data representing a compute load experienced by the first cluster; and
 generate and transmit a resource removal message to the first cluster controller when the compute load of the first cluster in the status data is below a threshold, the resource removal message indicating that a server from the first cluster is reassigned to the second cluster, the resource removal message instructing the first cluster controller to create or update a configuration file indicating that the server is reassigned from the first cluster, and thereby causing the first cluster controller to subsequently ignore the reassigned server.

11. The computing device of claim 10 wherein generating and transmitting the resource removal message includes generating and transmitting the resource removal message to the first cluster controller in response to a determination that (i) the compute load of the first cluster in the status data is below a threshold; and (ii) a compute load of the second cluster is above another threshold.

12. The computing device of claim 10 wherein the memory includes additional instructions executable by the processor to cause the computing device to:
 receive, via the computer network, additional status data from the first cluster controller of the first cluster, the additional status data representing another compute load experienced by the first cluster; and
 generate and transmit, at the first cluster controller, a resource assignment message when the another compute load in the transmitted additional status data is still below the threshold, the resource assignment message indicating that another server from the first cluster is assigned to the second cluster.

13. The computing device of claim 10 wherein the memory includes additional instructions executable by the processor to cause the computing device to:
 receive, via the computer network, additional status data from the first cluster controller, the additional status data representing another compute load experienced by the first cluster; and
 generate and transmit a resource assignment message when the another compute load of the first cluster in the transmitted additional status data is above another threshold, the resource assignment message indicating that the server from the second cluster is reassigned back to the first cluster.

14. The computing device of claim 10 wherein the memory includes additional instructions executable by the processor to cause the computing device to receive, at the first cluster controller, a resource assignment message from the external cluster resource manager when a compute load of the second cluster would not exceed a threshold when the server previously assigned from the first cluster is reassigned from the second cluster back to the first cluster, the resource assignment message indicating that the server from the second cluster is reassigned to the first cluster.

15. The computing device of claim 10 wherein the server reassigned from the first cluster to the second cluster is a frontend server configured to receive and respond to user requests for reading, writing, erasing, or performing other suitable data operations on user data associated with a user account.

16. The computing device of claim 10 wherein the server reassigned from the first cluster to the second cluster is a partition server configured to determine a location in which the requested user data or portions thereof is stored.

17. The computing device of claim 10 wherein the server reassigned from the first cluster to the second cluster is a backend storage server configured to perform storage, retrieval, or maintenance on at least a portion of the user data.

18. The computing device of claim 10 wherein the memory includes additional instructions executable by the processor to cause the computing device to generate and transmit another resource removal message, the another resource removal message indicating that another server from the first cluster is assigned to a third cluster, the another resource removal message instructing the first cluster controller to create or update the configuration file indicating that the another server is reassigned from the third cluster, and which is operable to cause the first cluster controller to ignore the reassigned another server during a reboot of the first cluster controller or a re-initialization of the first cluster.

19. A method of managing resources among clusters in a distributed computing system, the clusters including first and second clusters, individually containing multiple servers interconnected to one another by a computer network, and managed by a first cluster controller and a second cluster controller, respectively, the method comprising:

receiving, via the computer network, status data from a first cluster controller of the first cluster, the status data representing a compute load experienced by the first duster is above a threshold; and generate and transmit a resource reassignment message to the first duster controller at least partially in response to the compute load experienced by the first cluster being above the threshold, the resource reassignment message indicating that a server is being assigned from the second duster to the first duster and for causing a configuration file corresponding to the first cluster to be updated for the first duster to indicate that the server is reassigned from the second cluster to the first duster, without physically relocating the server from the second cluster to the first duster, and for enabling communications between the first duster and the server during subsequent re-initiation of the first duster according to the updated configuration file.

20. The method of claim 19, the server comprising a partition server.

* * * * *